United States Patent [19]

Puskas

[11] 4,178,124
[45] Dec. 11, 1979

[54] TURBINE APPARATUS

[76] Inventor: Alexander Puskas, 718 S. Trenton Ave., Pittsburgh, Pa. 15221

[21] Appl. No.: 896,930

[22] Filed: Apr. 17, 1978

[51] Int. Cl.$^2$ ............................................. F03D 1/04
[52] U.S. Cl. ......................................... 415/2; 415/75; 415/127; 415/157; 416/176; 416/189
[58] Field of Search ........................................ 415/2–4, 415/75, 127, 157; 416/176 A, 189 A

[56] References Cited

U.S. PATENT DOCUMENTS

| 1,002,833 | 9/1911 | Giddings | 415/2 |
| 1,361,696 | 12/1920 | Domenico | 415/3 |
| 2,004,853 | 6/1935 | Crary | 415/2 |

FOREIGN PATENT DOCUMENTS

| 29783 | 6/1922 | Denmark | 415/4 |
| 516675 | 4/1921 | France | 415/2 |
| 2283331 | 3/1976 | France | 415/3 |
| 7704977 | 11/1977 | Netherlands | 415/2 |
| 137771 | 3/1961 | U.S.S.R. | 415/157 |

Primary Examiner—Everette A. Powell, Jr.
Attorney, Agent, or Firm—Hubbard, Thurman, Turner, Tucker & Glaser

[57] ABSTRACT

Wind turbine apparatus is mounted on a stationary tower and disposed to intercept wind currents. An air intake member is mounted thereon having a frusto-conical shape for accelerating the velocity of the wind intercepted by the intake unit or member. A turbine unit is mounted on a stationary frame to rotate in relation to the frame about its longitudinal axis. The turbine unit is disposed at the output of the air intake unit to receive the air intercepted by the air intake unit. The turbine has a plurality of ducts each having an input facing the output of the air intake unit. The ducts extend substantially longitudinally and curve about the longitudinal axis of the turbine. The duct outlets are disposed about the periphery of the turbine at a substantially right angle to the longitudinal axis to emit air jets tangential to the turbine unit. A power shaft is attached to the output of the turbine to connect to a generator or any mechanical driven machine. The turbine apparatus is mounted on a rotational bearing to enable pivoting about the vertical axis to maintain the air intake facing into the direction of the wind flow. An aerodynamic fin is attached to the turbine apparatus to assist in positioning the air intake member in the direction of wind flow. The air intake member has an adjustable intake extension for improving the turbine performance or for increasing the amount of air intercepted.

19 Claims, 8 Drawing Figures

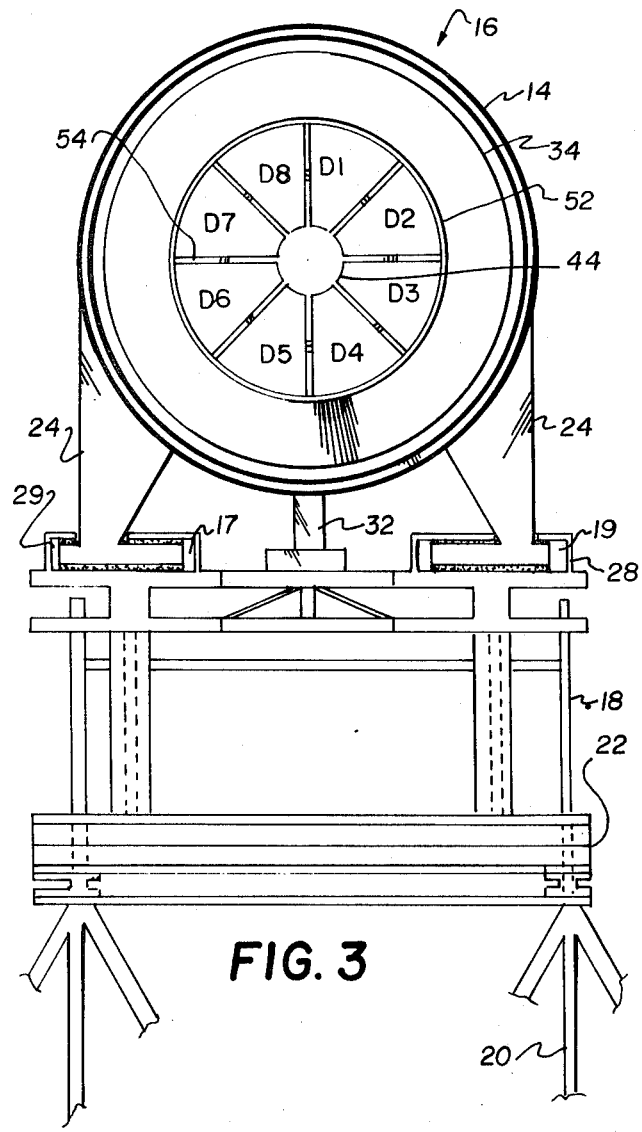
FIG. 3
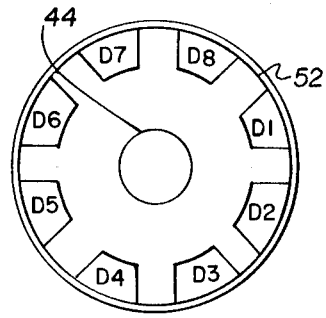
FIG. 4
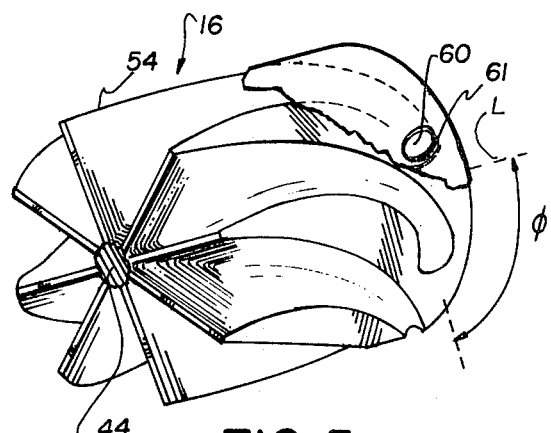
FIG. 5
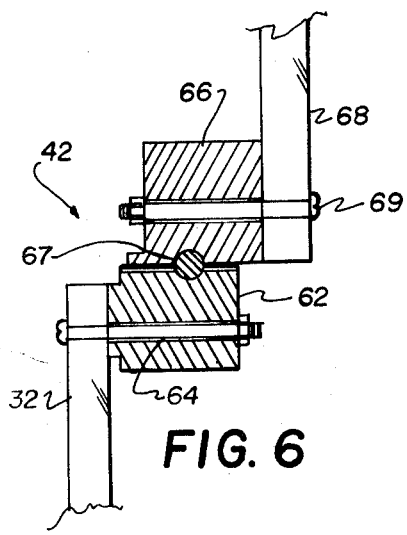
FIG. 6
FIG. 7
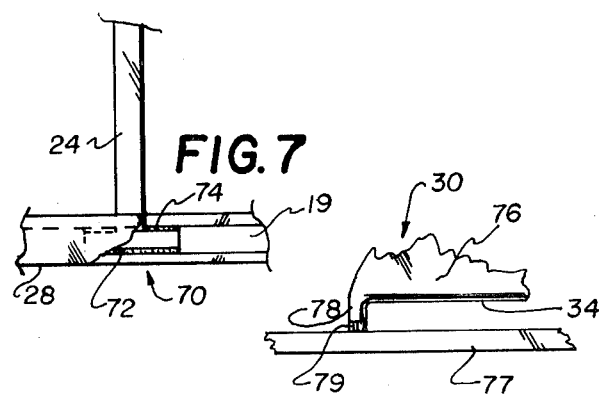
FIG. 8

TURBINE APPARATUS

BACKGROUND AND SUMMARY OF THE INVENTION

This invention is concerned with fluid turbine apparatus and more particularly with an improved wind-driven turbine for intercepting and utilizing wind flow to generate mechanical energy.

In the last few years, the increase in conventional fuel shortages has sharpened interest in developing alternate means of generating mechanical and electrical energy. Wind currents have been utilized for many years as a source of kinetic energy to drive mechanical apparatus and power generators. One of the major difficulties encountered with such devices is the undesirable variation in the amount, direction and force of such wind currents. Another problem has been the difficulty in converting a high percentage of the intercepted wind current force to useful energy forms. Typical windmill-type devices have not been able to utilize a sufficient amount of the wind force to be economical in many applications. Another related difficulty has been in capturing sufficient wind currents to generate the amount of energy needed.

The present invention utilizes an improved wind turbine apparatus for overcoming the foregoing problems and providing a more efficient and useful system. The turbine apparatus of the present invention includes an intake unit mounted on a framework to intercept a portion of the fluid flow in a fluid stream. A turbine unit including a turbine housing is rotatably mounted on the framework adjacent to the intake unit to rotate in response to the portion of fluid flow intercepted by the intake unit. The turbine unit includes a plurality of passages extending substantially longitudinally along the turbine and bending about the longitudinal axis of the turbine housing. Each of the passages has an inlet at the front face of the turbine housing adjacent to the fluid intake unit and an outlet at the periphery of the turbine housing to emit a fluid jet tangential to the periphery of the turbine housing.

In accordance with another more specific aspect of the present invention, a wind turbine apparatus is provided for intercepting and utilizing wind flow to generate mechanical energy. A rigid framework is used to mount the wind turbine apparatus so as to intercept the wind flow. A turbine unit is rotatably mounted on the framework with its axis being substantially aligned with the direction of wind flow. An air intake unit including a conically-shaped funnel is positioned in front of the turbine unit to direct the wind flow into the turbine. The turbine unit includes a plurality of ducts running substantially longitudinally along the turbine unit and curving about the longitudinal axis. The ducts each have an opening at the front of the turbine unit adjacent to the air intake unit and an outlet near the rear of the turbine unit opposite the intake unit. Each of the ducts is curved about the longitudinal axis of the turbine unit so that the incoming wind flow creates rotational torque forces on the turbine unit about its longitudinal axis. Each of the ducts also has an outlet on the periphery of the turbine unit in a direction disposed at a substantial angle from the longitudinal axis to impart a reactive force resulting in further torque of the turbine unit about its longitudinal axis.

The above-described invention has a number of advantages over previous fluid or wind turbines. A substantially higher portion of the kinetic energy of the fluid is utilized with the structure of the present invention. The emission of fluid jets about the periphery of the turbine provides a substantial additional rotational force to power the turbine. Moreover, curved ducts or passages within the turbine allow the conversion of much of the wind force into a rotational torque force on the turbine. Thus, very little kinetic energy is lost from the fluid or wind forces. The invention also preferably includes a telescoping funnel unit extending outward in front of the air intake unit to capture a substantial additional amount of the wind or fluid in the vicinity of the turbine unit. Moreover, the turbine apparatus is preferably mounted on a tall tower to extend into the stronger wind forces encountered at increased heights and includes a rotational bearing and aerodynamic fin for automatically rotating the turbine apparatus about its vertical axis to maintain the mouth of the air intake unit in the direction of the wind or fluid flow.

BRIEF DESCRIPTION OF THE DRAWINGS

A more complete understanding of the invention may be had by referring to the following detailed description when taken in conjunction with the drawings wherein:

FIG. 3 is a cross-section of the turbine apparatus of FIG. 2 taken along lines 3—3;

FIG. 4 is a cross-section of the turbine unit of FIG. 2 taken along line 4—4;

FIG. 5 is a perspective view of the rotating turbine unit of the system shown in FIGS. 1 and 2;

FIG. 6 is a blown-up cross-section of the annular bearing shown in FIG. 2;

FIG. 7 is a blown-up partial cross-sectional view of the support structure shown in FIG. 3; and FIG. 8 is a blown-up view showing a sliding member of the air intake unit as shown in FIG. 2.

DETAILED DESCRIPTION OF THE DRAWINGS

Figure 1:
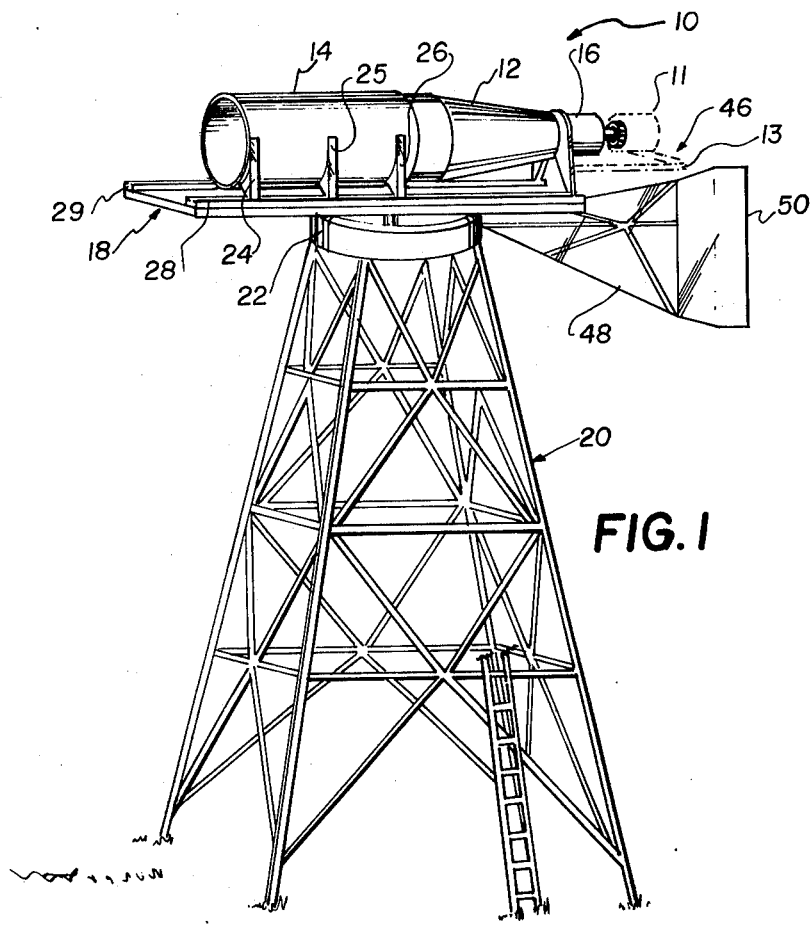
FIG. 1 is a perspective view of the fluid turbine system embodying the present invention.
Figure 2:
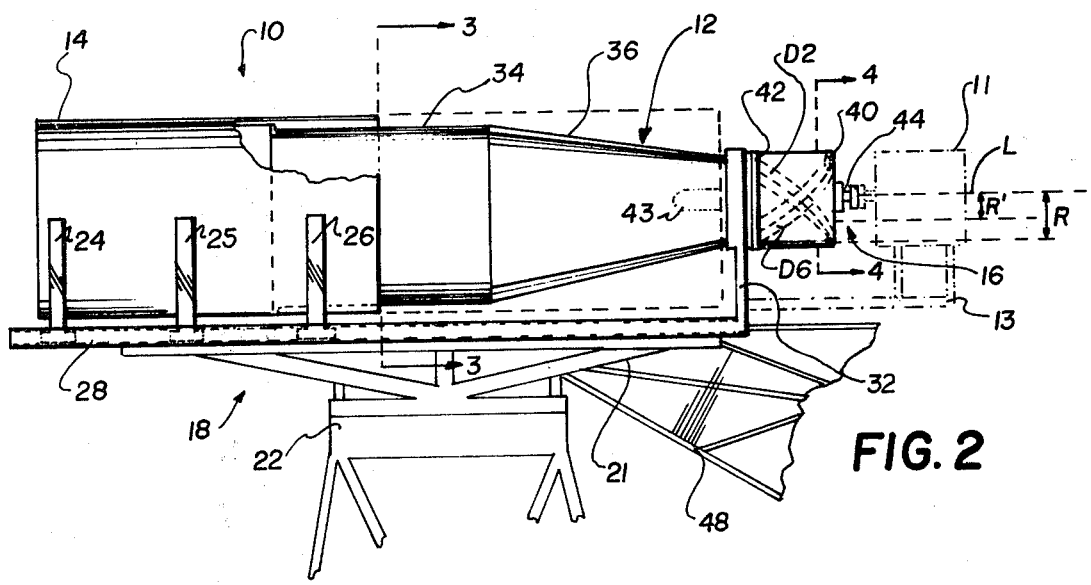
FIG. 2 is a partial cross-sectional view of the turbine system shown in FIG. 1.

Referring now to FIGS. 1 and 2, a preferred embodiment of the present invention utilizing a wind turbine apparatus 10 is shown. Apparatus 10 includes an air intake or accelerator unit 12, a telescoping air intake extension unit 14 and a turbine unit 16. All three units are mounted on a platform 18 which in turn is rotatably disposed on a stationary tower 20 by azimuth bearing unit 22 for rotation about the vertical axis. A driven device 11 may also be mounted on platform 18 and connected to turbine 16.

Telescoping air intake extension unit 14 is mounted on platform 18 by means of three pairs of support legs 24, 25 and 26, each said pairs being located on either side of the extension unit 14.

Support leg pairs 24, 25 and 26 are slidably mounted on a longitudinally-extending beam 28 on platform 18 in a manner which will be described in greater detail later. In FIG. 1 unit 14 is shown fully extended in front of unit 12 with legs 24, 25 and 26 at their fully extended positions along beams 28 and 29. In FIG. 2, extension unit 14 is shown in a fully extended position, and the dotted lines show unit 14 in a fully retracted position substantially surrounding accelerator 12.

The front end of accelerator 12 rides along the inside bottom surface of extension unit 14 by means of a support member 30 which is shown in greater detail in FIG. 8. Accelerator 12 is attached at the rear portion by means of a support member 32. Accelerator unit 12 includes a front cylindrical section 34 within extension unit 14 having a radius slightly smaller than unit 14. A second portion 36 is a frusto-conical section attached between the rear of cylindrical section 34 and support member 32.

Attached to the back end of accelerator 12 so as to interface with the rear face of conical section 36 is a rotatable turbine unit 40. Turbine unit 40 is attached to support member 32 by means of an annular bearing 42. Turbine unit 40 extends longitudinally along the longitudinal axis L of accelerator 12 and includes an output drive shaft 44 for transmitting the rotational energy of the turbine unit 40. A bullet-nose shaped shroud 43 extends from the front of drive shaft 44 into accelerator 12 to minimize aerodynamic disturbances caused by drive shaft 44.

A driven device 11 may be attached to shaft 44 supported by a suitable brace 13, as shown. Device 11 may be any type of conventional unit such as a generator or fly wheel so that it is not necessary to show further detail.

Attached to one side of platform 18 is an aerodynamic structure 46 including a framework 48 extending from a slanted support beam 21 at platform 18 and attached to a large aerodynamic fin 50 extending along a substantially vertical axis. It is understood that several such fins may be used to increase stability.

Referring now to FIG. 3, a cross-section of the wind turbine apparatus 10 taken along line 3—3 of FIG. 1 is shown. The turbine wind unit 16 comprises a closed cylindrical housing 52 having eight air ducts $D_1$-$D_8$ therein. The output drive shaft 44 extends through the center of the turbine housing 52 with duct walls 54 extending radically therefrom to the turbine housing 52. It should be understood that the number of ducts in housing 52 may vary according to the requirements for each embodiment.

Ducts $D_1$-$D_8$ extend longitudinally within turbine housing 52 while also curving about the longitudinal axis. The shape of the ducts are better understood by the dotted lines in FIG. 2 showing the paths taken by ducts $D_4$ and $D_8$. The ducts also decrease in cross-sectional area from the front to the rear of turbine housing 52. FIG. 4 shows a cross-section of turbine 16 taken along lines 4—4 of FIG. 1 near the rear of the turbine. At this point each of ducts $D_1$-$D_8$ are substantially decreased in cross-section area from that shown in FIG. 3 and are located about the inner periphery of housing 52.

The outlet of each duct is best shown in FIG. 5. Each outlet forms a jet port 60 at the periphery of housing 52 which directs a jet of air tangential to the periphery. The air is also directed at an angle substantially at right angles to the longitudinal axis L of the turbine so as to impart a rotational torque to the turbine housing. An indentation 61 is located in the housing.

Referring now to FIG. 6, annular bearing 42 is shown in greater detail. The bearing shown is a "slewing ring" type. However any type bearing is satisfactory as long as it can absorb axial, transverse and moment loads. The outer race 62 of bearing 42 is attached to support member 32 by bolt 64 extending through the center of race 62. Support member 32 in turn is connected to accelerator 12 and longitudinal beam 28.

Inner race member 66 of bearing 42 abuts along the inner surface of race 62 and rolls about axis L on rollers 67. Member 66 is attached to a member 68 which is part of turbine housing 52 by means of a bolt 69 extending through the center of inner race member 66. Inner face member 66 rotates about the inner circumference of outer race member 62 to provide the rotation of turbine 16 about longitudinal axis L.

With reference now to FIG. 7, the bottom portion of one of support leg pairs 24 is shown in longitudinal cross-section. A rectangular foot 70 is connected to the bottom of support leg 24 with low-friction sliding pads 72 and 74 at the bottom and top respectively of base 70. This construction enables base 70 to slide longitudinally along beam 28 in channel 19 as also shown in FIG. 3. Sliding pad 72 and 74 are preferably made of Teflon but it is understood that any type of low friction material may be used. Other members such as rollers may be used in place of pads 72 and 74.

Referring now to FIG. 8, support member 30 for the front portion of accelerator 12 is shown in greater detail. Member 30 comprises a plurality of arms 78 spaced around the periphery 76 of section 34 at the front thereof. Arms 78 extend radically to contact the wall 77 of extension unit 14 by means of a low friction sliding pad 79. This pad is preferably of Teflon but any other low friction material may be used as well.

In operation, the present invention functions to convert the kinetic energy of wind flow currents to mechanical rotational energy of the turbine which can be transmitted to mechanical apparatus or a power generator. With wind turbine apparatus 10 disposed on tower 20 as shown, the aerodynamic structure 46 will automatically rotate apparatus 10 about azimuth bearing 22 to direct the front of extension unit 14 and accelerator 12 in the direction of the wind current. The air then enters through extension unit 14, into accelerator 12 and finally passes through turbine 16, imparting the necessary rotational force thereto.

The air enters telescoping extension unit 14 at a velocity V with some slight losses therein due to random turbulence and friction. As the wind moves through accelerator 12 the cross-sectional area decreases causing the pressure to drop and the velocity to increase. The velocity at the outlet end of accelerator 12 is approximated by the following equation:

$$V_0 = \left\{ \frac{2k}{k-1} \left(\frac{P_1}{d}\right)\left[1 - \left(\frac{P_2}{P_1}\right)^{(k-1)/k}\right]\right\}^{\frac{1}{2}}$$

where K is the flow co-efficient, $P_1$ and $P_2$ are pressures at the inlet and outlet respectively of accelerator 12, and d is the density of air (inertial). See "Handbook of Fluid Dynamics" by V. Streeter, McGraw Hill.

The air then enters the intake end of turbine 16 at a velocity of $V_0$ and enters the curved ducts $D_1$-$D_8$ at that velocity. As the duct cross-section decreases the air stream accelerates and the pressure drops so that a maximum velocity $V_0'$ is reached at the duct exhaust port 60.

As the air jet exits the port 60 at substantially right angles to longitudinal axis L it will create a reactive jet force F at right angles to axis L to provide a torque about said axis of F times the radius R of turbine housing 52.

The force F is given by the equations:

$$F = GV_0'/g = G(w-u)/g$$

where G is the mass flow, g is the gravitational constant, w is the relative jet velocity and u is the absolute output nozzle velocity. A turbine energy is then given by the equation:

$$\Delta E_r = G(w-u)u/g$$

In addition to this jet reactive force and the resultant torque imparted to the turbine unit, a second force adds substantially to that torque resultant. As previously mentioned, each of ducts $D_1$–$D_8$ curves about longitudinal axis L and also change directions to exit substantially perpendicular to axis L. This curvature and change of direction produces a resultant force having two components, one parallel to axis L and the other perpendicular to axis L. The parallel force component produces no usable torque about axis L but is dissipated as frictional torque in bearing 42. This frictional torque is small since the rolling friction co-efficient of such bearings is in the order of approximately 0.003. The force F' perpendicular to axis L acts at a resultant radius R' from axis L and produces a torque about axis L of F' times R'. This force is given by the equation:

$$F' = P_2 A_2 \sin\phi + dV_2 \sin\phi$$

where $P_2$, $A_2$, and $V_2$ are the pressure, area and velocity at the exhaust ports 60, d is the density of air (inertial) and $\phi$ is the angle between axis L and the axis M of the output port 60 at the point of emission of the air jet. This angle is preferably greater than zero and less than 90 degrees.

It is understood that the components of wind turbine apparatus 10 may be made of any suitable material to accomplish the previously described task. Preferably supporting structure 18 is made of a strong corrosive-resistant metal. Telescoping extension unit 14 and accelerator 12 are preferably made of simple sheet metal in cylindrical or conical shape as shown. Turbine unit 16 is preferably comprised of some type of cylindrically-shaped metal which can withstand the rotational forces upon it by the focused wind currents. It is also understood that although eight ducts are shown forming the interior of turbine unit 16, any number and shape may be utilized, including a "honeycombed" configuration to provide the necessary plurality of curved passages.

Turbine 16 can also be built several different angles in connection with accelerator 12. For example, the turbine unit might be disposed at right angles to accelerator 12 and still operate very efficiently in certain applications. Moreover, although the accelerator has been described as a single frusto-conical shaped unit, it may also be separated into a number of different chambers or may include a plurality of flutes or curved vanes to enhance the rotary motion of the wind.

Although a preferred embodiment of the invention has been described in detail, it is understood that various changes, substitutions and alterations can be made therein without departing from the spirit and scope of the invention as described by the appended claims.

What is claimed is:

1. Turbine apparatus adapted for disposition in a fluid stream to convert the kinetic energy of the fluid flow to mechanical rotation energy comprising:
   fluid stream gathering means mounted on a framework for intercepting a portion of the fluid flow in the fluid stream, said gathering means having an inlet port and an exhaust port;
   turbine means including a turbine housing rotatably mounted on said frame adjacent to said exhaust port for rotatably responsing to the portion of the fluid flow intercepted by the inlet port; and
   a plurality of passages within said turbine means extending substantially longitudinally along said turbine means and bending about the longitudinal axis of the turbine housing, each of said passages having an inlet at one face of the turbine housing adjacent to the exhaust port and having an outlet at the periphery of the turbine housing, each said passage tapering axially and radially towards the said periphery to emit a fluid jet tangential to the periphery of the turbine housing at about a right angle to the longitudinal axis of the turbine housing.

2. The apparatus of claim 1 wherein each of said passages runs substantially longitudinally along said turbine means and curves about the longitudinal axis of the turbine housing.

3. The apparatus of claim 1 wherein each of said passages spirals about the longitudinal axis of the turbine housing.

4. The apparatus of claim 1 wherein each of said passages comprises a duct having a cross-sectional area which decreases from the inlet to the outlet of the duct.

5. The apparatus of claim 1 wherein the intake means includes a telescoping funnel slidably mounted on the stationary frame to move along the longitudinal axis of the fluid intake means to extend substantially in front of said intake means and direct fluid thereto.

6. The apparatus of claim 1 wherein said intake means comprises a frusto-conical section with the larger end at the front of the fluid intake means and the smaller end adjacent to the turbine means.

7. The apparatus of claim 1 wherein said air intake means is stationary with regard to said framework and further comprising a telescopic section slidable with respect to said air intake means and extendable in front of said air intake means.

8. The apparatus of claim 1 wherein said framework is mounted on a bearing for rotation about the vertical axis to maintain the front of the fluid intake means facing into the fluid stream.

9. The apparatus of the claim 8 and further comprising aerodynamic means attached to such stationary frame for responding to said fluid flow to assist in orienting said fluid intake means in the direction of said fluid flow.

10. The apparatus of claim 1 and further comprising power output means connected to the turbine means to transmit the mechanical rotational energy to a generator.

11. Wind turbine apparatus for intercepting and utilizing wind flow to generate mechanical energy comprising:
   mounting means for disposing said wind turbine apparatus to intercept said wind flow:
   a turbine unit mounted on said framework to rotate about its longitudinal axis;
   wind flow gathering means in front of said turbine unit for directing the wind flow into said turbine unit, said gathering means having an inlet port for receiving the wind flow and an exhaust port for directing the wind flow to the turbine unit;

a plurality of ducts in said turbine unit each having an opening at the front of the turbine unit adjacent to the exhaust port and an outlet near the rear of the turbine unit removed from the exhaust port;

each of said ducts being curved about the longitudinal axis of the turbine unit so that the incoming wind flow creates a rotational torque force on the turbine unit about its longitudinal axis, each of said ducts tapering axially and radially towards the periphery of the turbine unit and having an outlet on the periphery of the turbine unit shaped to emit an air jet in a direction tangential to the periphery of the turbine unit and at about a 90 degree angle to the longitudinal axis to impart a reactive force resulting in further torque of the turbine unit about its longitudinal axis.

12. The apparatus of claim 11 wherein the cross-section of each duct substantially decreases from the front to the rear of the turbine unit.

13. The apparatus of claim 11 wherein each of said ducts runs substantially longitudinally along the turbine unit and curves about said longitudinal axis.

14. The apparatus of claim 11 wherein the duct outlets emit air jets in a direction about 90 degrees from said longitudinal angle.

15. The apparatus of claim 11 wherein the air intake means comprises a conically-shaped funnel.

16. The apparatus of claim 11 and further comprising a telescopic section slidable with respect to the air intake means and extendable in front of said air intake means.

17. The apparatus of claim 11 wherein the turbine unit is mounted to rotate about an axis substantially aligned with the direction of the wind flow.

18. The apparatus of claim 11 wherein said mounting means comprises a frame mounted on a bearing for rotation about a vertical axis to point the air intake means into the wind flow.

19. Wind turbine apparatus for intercepting and utilizing wind flow to generate mechanical energy comprising:

a rigid framework for disposing said wind turbine apparatus to intercept said wind flow;

a turbine unit mounted on said framework to rotate about its longitudinal axis, said axis being substantially aligned with the direction of said wind flow;

wind flow gathering means comprising a conically-shaped funnel in front of said turbine unit for directing the wind flow into said turbine unit, said gathering means having an inlet port for receiving the wind flow and an exhaust port for directing the wind flow to the turbine unit;

a plurality of ducts in said turbine unit running substantially longitudinally within the turbine unit and curving about said axis, said ducts each having an opening at the front of the turbine unit adjacent to the exhaust port and an outlet near the rear of the turbine unit removed from the exhaust port;

each of said ducts being curved about the longitudinal axis of the turbine unit whereby the incoming wind flow creates rotational torque forces on the turbine unit about its longitudinal axis, each of said ducts tapering axially and radially toward the periphery of the turbine unit and having an outlet on the turbine unit about its longitudinal axis, each of said ducts having an outlet on the periphery of the turbine unit shaped to emit an air jet in a direction tangential to the periphery of the turbine housing and at about a 90 degree angle to the longitudinal axis to impart a reactive force resulting in further torque of the turbine unit about its longitudinal axis.

* * * * *